United States Patent
Oroskar

(10) Patent No.: US 9,351,278 B1
(45) Date of Patent: May 24, 2016

(54) CONTROLLING WIRELESS PAGING PARAMETERS BASED ON DEVICE TYPE PREVALENCE

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 103 days.

(21) Appl. No.: 14/160,032

(22) Filed: Jan. 21, 2014

(51) Int. Cl.
| | |
|---|---|
| H04B 7/00 | (2006.01) |
| H04W 68/08 | (2009.01) |
| H04W 72/04 | (2009.01) |
| H04W 4/00 | (2009.01) |
| H04W 48/12 | (2009.01) |
| H04W 24/10 | (2009.01) |
| H04W 28/08 | (2009.01) |

(52) U.S. Cl.
CPC .............. *H04W 68/08* (2013.01); *H04W 4/00* (2013.01); *H04W 4/005* (2013.01); *H04W 24/10* (2013.01); *H04W 28/08* (2013.01); *H04W 48/12* (2013.01); *H04W 72/048* (2013.01); *H04W 72/0486* (2013.01)

(58) Field of Classification Search
CPC .... H04W 4/005; H04W 68/02; H04W 84/027
USPC ....................................... 455/426.1, 458, 515
See application file for complete search history.

(56) References Cited

U.S. PATENT DOCUMENTS

| | | | |
|---|---|---|---|
| 5,369,681 | A | 11/1994 | Boudreau et al. |
| 5,737,703 | A | 4/1998 | Byrne |
| 5,774,461 | A | 6/1998 | Hyden et al. |
| 5,778,319 | A | 7/1998 | Sawaki |
| 5,898,679 | A | 4/1999 | Brederveld et al. |
| 5,907,540 | A | 5/1999 | Hayashi |
| 5,978,463 | A | 11/1999 | Jurkevics et al. |
| 6,069,871 | A | 5/2000 | Sharma et al. |
| 6,111,865 | A | 8/2000 | Butler et al. |
| 6,115,762 | A | 9/2000 | Bell et al. |

(Continued)

FOREIGN PATENT DOCUMENTS

| | | |
|---|---|---|
| EP | 2 244 502 | 10/2010 |
| WO | 01/47287 | 6/2001 |
| WO | 2011/053222 | 5/2011 |

OTHER PUBLICATIONS

3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.

(Continued)

*Primary Examiner* — Charles Appiah
*Assistant Examiner* — Jaime Holliday

(57) ABSTRACT

A determination may be made that a region of the RAN is serving more than a threshold extent of WCDs configured for machine-to-machine communication. The region of the RAN may include a set of one or more wireless coverage areas, and each wireless coverage area in the set of wireless coverage areas may include at least one paging channel. The paging channel parameters of each wireless coverage area in the set of wireless coverage areas may be modified to increase a rate at which the RAN successfully pages WCDs via the set of wireless coverage areas.

19 Claims, 7 Drawing Sheets

(56) References Cited

U.S. PATENT DOCUMENTS

| | | |
|---|---|---|
| 6,181,945 B1 | 1/2001 | Lee |
| 6,185,421 B1 | 2/2001 | Alperovich et al. |
| 6,205,495 B1 | 3/2001 | Gilbert et al. |
| 6,216,004 B1 | 4/2001 | Tiedemann, Jr. et al. |
| 6,223,042 B1 | 4/2001 | Raffel |
| 6,289,227 B1 | 9/2001 | Shi |
| 6,292,747 B1 | 9/2001 | Amro et al. |
| 6,295,451 B1 | 9/2001 | Mimura |
| 6,307,846 B1 | 10/2001 | Willey |
| 6,327,254 B1 | 12/2001 | Chuah |
| 6,330,244 B1 | 12/2001 | Swartz et al. |
| 6,438,117 B1 | 8/2002 | Grilli et al. |
| 6,556,831 B1 | 4/2003 | Buppelmann |
| 6,643,520 B1 | 11/2003 | Park et al. |
| 6,650,912 B2 | 11/2003 | Chen et al. |
| 6,680,923 B1 | 1/2004 | Leon |
| 6,687,285 B1 | 2/2004 | Jou |
| 6,745,039 B1 | 6/2004 | Di Lalla |
| 6,798,786 B1 | 9/2004 | Lo et al. |
| 6,895,058 B2 | 5/2005 | Abrishamkar et al. |
| 6,922,561 B2 | 7/2005 | Chen et al. |
| 6,963,750 B1 | 11/2005 | Cheng et al. |
| 6,980,820 B2 | 12/2005 | Sinnarajah et al. |
| 7,065,361 B1 | 6/2006 | Fortuna |
| 7,130,625 B2 | 10/2006 | Akgun et al. |
| 7,167,458 B2 | 1/2007 | Agashe et al. |
| 7,177,658 B2 | 2/2007 | Willenegger et al. |
| 7,193,987 B2 | 3/2007 | Vilander |
| 7,260,415 B1 | 8/2007 | Oh |
| 7,317,706 B1 | 1/2008 | Hao et al. |
| 7,349,699 B1 | 3/2008 | Kelly et al. |
| 7,366,526 B2 | 4/2008 | Zhang et al. |
| 7,376,091 B1 | 5/2008 | Eccles et al. |
| 7,386,030 B2 | 6/2008 | Asghar et al. |
| 7,408,948 B2 | 8/2008 | Lopponen et al. |
| 7,693,526 B2 | 4/2010 | Qian et al. |
| 7,720,021 B1 | 5/2010 | Zhou et al. |
| 7,768,998 B1 | 8/2010 | Everson et al. |
| 7,873,074 B1 | 1/2011 | Boland |
| 7,953,040 B2 | 5/2011 | Harikumar et al. |
| 8,139,525 B1 | 3/2012 | Vondemkamp et al. |
| 8,160,611 B1 | 4/2012 | Oroskar |
| 8,160,618 B2 | 4/2012 | Harris |
| 8,160,619 B1 | 4/2012 | Oroskar et al. |
| 8,203,963 B1 | 6/2012 | Oroskar et al. |
| 8,204,517 B1* | 6/2012 | Rai et al. ............... 455/458 |
| 8,238,906 B1 | 8/2012 | Oroskar et al. |
| 8,254,920 B1 | 8/2012 | Oroskar et al. |
| 8,254,930 B1 | 8/2012 | Mauer et al. |
| 8,265,039 B2 | 9/2012 | Reza et al. |
| 8,270,979 B1 | 9/2012 | Vargantwar |
| 8,306,558 B1 | 11/2012 | Oroskar et al. |
| 8,355,740 B1 | 1/2013 | Oroskar et al. |
| 8,359,028 B1 | 1/2013 | Vargantwar et al. |
| 8,391,858 B1 | 3/2013 | Vargantwar et al. |
| 8,396,076 B2 | 3/2013 | Borella et al. |
| 8,452,312 B1 | 5/2013 | Oroskar et al. |
| 8,457,069 B1 | 6/2013 | Vargantwar et al. |
| 8,521,195 B1 | 8/2013 | Oroskar et al. |
| 2001/0034233 A1 | 10/2001 | Tiedemann, Jr. et al. |
| 2001/0036830 A1 | 11/2001 | Wu et al. |
| 2002/0082010 A1 | 6/2002 | Koorapaty et al. |
| 2003/0063569 A1 | 4/2003 | Kalliokulju et al. |
| 2003/0091021 A1 | 5/2003 | Trossen et al. |
| 2003/0189950 A1 | 10/2003 | Spear et al. |
| 2004/0002340 A1 | 1/2004 | Lim et al. |
| 2004/0008627 A1 | 1/2004 | Garg et al. |
| 2004/0037264 A1 | 2/2004 | Khawand |
| 2004/0125768 A1 | 7/2004 | Yoon et al. |
| 2004/0165563 A1 | 8/2004 | Hsu et al. |
| 2004/0224719 A1 | 11/2004 | Nounin et al. |
| 2004/0236850 A1 | 11/2004 | Krumm et al. |
| 2004/0252669 A1 | 12/2004 | Hosein |
| 2005/0085253 A1 | 4/2005 | Mansour |
| 2005/0164718 A1 | 7/2005 | Rajkotia et al. |
| 2005/0261899 A1 | 11/2005 | Brueck et al. |
| 2005/0288018 A1 | 12/2005 | Huang et al. |
| 2006/0040681 A1 | 2/2006 | Julka et al. |
| 2006/0058056 A1 | 3/2006 | Das et al. |
| 2006/0142051 A1 | 6/2006 | Purnadi et al. |
| 2006/0160551 A1 | 7/2006 | Matoba et al. |
| 2006/0174015 A1 | 8/2006 | Arauz-Rosado |
| 2006/0199608 A1 | 9/2006 | Dunn et al. |
| 2006/0221885 A1 | 10/2006 | Nagaraj |
| 2006/0251033 A1 | 11/2006 | Oprescu-Surcobe et al. |
| 2007/0043558 A1 | 2/2007 | Schwarz et al. |
| 2007/0047707 A1 | 3/2007 | Mayer et al. |
| 2007/0053336 A1 | 3/2007 | Petrovic et al. |
| 2007/0105535 A1 | 5/2007 | Jacobson et al. |
| 2007/0173252 A1 | 7/2007 | Jiang |
| 2007/0232330 A1 | 10/2007 | Ranganathan |
| 2008/0025235 A1 | 1/2008 | Mahany et al. |
| 2008/0028695 A1 | 2/2008 | Fennell |
| 2008/0032713 A1 | 2/2008 | Yang |
| 2008/0070596 A1 | 3/2008 | Willey |
| 2008/0096520 A1 | 4/2008 | Benco et al. |
| 2008/0096585 A1 | 4/2008 | Willey |
| 2008/0192666 A1 | 8/2008 | Koskan et al. |
| 2008/0293419 A1 | 11/2008 | Somasundaram et al. |
| 2008/0293437 A1 | 11/2008 | Ranganathan et al. |
| 2008/0293438 A1 | 11/2008 | Harris |
| 2009/0016328 A1 | 1/2009 | Peisa et al. |
| 2009/0061854 A1 | 3/2009 | Gillot et al. |
| 2009/0209300 A1 | 8/2009 | Furbeck |
| 2009/0227277 A1 | 9/2009 | Gupta et al. |
| 2009/0247137 A1 | 10/2009 | Awad |
| 2009/0303983 A1 | 12/2009 | Kennedy |
| 2009/0322582 A1 | 12/2009 | Baugh et al. |
| 2010/0311420 A1 | 12/2010 | Reza et al. |
| 2010/0322198 A1 | 12/2010 | Friday et al. |
| 2011/0021197 A1 | 1/2011 | Ngai |
| 2011/0034167 A1 | 2/2011 | Ben-Shaul et al. |
| 2011/0159931 A1 | 6/2011 | Boss et al. |
| 2013/0029713 A1 | 1/2013 | Jang et al. |
| 2013/0130738 A1* | 5/2013 | Cherian et al. ............... 455/522 |
| 2013/0136072 A1* | 5/2013 | Bachmann et al. ..... H04W 4/00 370/329 |
| 2014/0087721 A1 | 3/2014 | Dimou |
| 2014/0128062 A1* | 5/2014 | Batchu et al. ............... 455/435.1 |
| 2014/0192659 A1* | 7/2014 | Tian et al. ............... 370/252 |
| 2014/0349660 A1 | 11/2014 | Abdalla |
| 2015/0009813 A1* | 1/2015 | Nguyen ............... 370/230 |

OTHER PUBLICATIONS

Advisory Action for U.S. Appl. No. 11/535,870 dated Feb. 18, 2010, 14 pages.

Cai, L. et al., "Mitigating DoS Attacks on the Paging Channel by Efficient Encoding in Page Messages," In: Proceedings of 5th International ICST Conference on Security and Privacy in Communication Networks (SecureComm 2009) Sep. 2009, 20 pages.

CouthIT, "EVRC-A," 1 page, May 18, 2012 (www.couthit.com/codec-evrc.asp).

CouthIT, "EVRC-B," 1 page, May 18, 2012 (www.couthit.com/codec-evrc-b.asp).

CouthIT, "EVRC-NW," 2 pages, May 18, 2012 (www.couthit.com/codec-evrc-nw.asp).

CouthIT, "EVRC-C, EVRC-WB," 2 pages, May 18, 2012 (www.couthit.com/codec-evrc-wb.asp).

Desineni et al., "RTP Payload Format for the Enhanced Variable Rate Wideband Codec (EVRC-WB) and the Media Subtype Updates for EVRC-B Codec," Network Working Group, pp. 1-25 (Feb. 2008).

"E-200 Cassiopeia Pocket PC 2002," Casio, http://www.casio.com/personalpcs/products.cfm?section=19&product=4146, printed Feb. 22, 2002.

"Enhanced Variable Rate Codec, Speech Service Options 3, 68, 70, and 73 for Wideband Spread Spectrum Digital Systems," 3rd Generation Partnership Project 2, 3GPP2 C.S0014-D, Version 1, pp. 1-1 through 9-24 (May 2009).

Final Office Action for U.S. Appl. No. 11/535,870 dated Nov. 12, 2009, 22 pages.

(56) References Cited

OTHER PUBLICATIONS

First Action Interview Pilot Program Pre-Interview Communication for U.S. Appl. No. 13/483,920 mailed Sep. 26, 2013 (29 pages).
Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).
International Search Report and Written Report for PCT/US2012/028070 mailed May 7, 2012, 15 pages.
Internet Engineering Task Force ("IETF") Request for Comments ("RFCs") 768, "User Datagram Protocol," J. Postel, Aug. 1980.
Internet Engineering Task Force ("IETF") Request for Comments ("RFCs") 791, "Internet Protocol DARPA Internet Program Protocol Specification," Information Sciences Institute, Sep. 1981.
Internet Engineering Task Force ("IETF") Request for Comments ("RFCs") 793, "Transmission Control Protocol DARPA Internet Program Protocol Specification," Information Sciences Institute, Sep. 1981.
Notice of Allowance for U.S. Appl. No. 13/011,028 mailed Dec. 7, 2012 (15 pages).
NTT DoCoMo et al., "IDLE Mode Mobility Control Principles," 3GPP TSG RAN WG2 #59BIS; 3GPP Draft; R2-074001, 8 pages, Oct. 8-12, 2007.
NTT DoCoMo et al., "Load Balancing Solutions for LTE," 3GPP TSG RAN WG2 #58bis; 3GPP Draft; R2-072719, 5 pages, Jun. 22, 2007.
Office Action for U.S. Appl. No. 11/535,870 dated Apr. 3, 2009, 14 pages.
Office Action for U.S. Appl. No. 12/815,700 dated Dec. 14, 2011, 9 pages.
Office Action for U.S. Appl. No. 12/815,709 dated Feb. 21, 2012, 5 pages.
Office Action for U.S. Appl. No. 13/483,933 mailed Oct. 7, 2013 (25 pages).
Office Action for U.S. Appl. No. 13/598,042 mailed Oct. 25, 2012 (35 pages).
Office Action for U.S. Appl. No. 11/393,058, dated Jan. 21, 2009, 21 pages.
Perkins, C., "IP Mobility Support," Network Working Group, Request for Comments: 2002, Oct. 1996, 79 pages.
Perkins, C., "IP Encapsulation within IP," Network Working Group, Request for Comments: 2003, Oct. 1996, 14 pages.
Perkins, C., "Minimal Encapsulation within IP," Network Working Group, Request for Comments: 2004, Oct. 1996.
Solomon, J., "Applicability Statement for IP Mobility Support," Network Working Group, Request for Comments: 2005, Oct. 1996, 5 pages.
TIA Standard, "Interoperability Test Specification for cdma2000® Air Interface," TIA-1036, Section 3.11, Jan. 2005, 4 pages.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.
U.S. Appl. No. 12/261,229, filed Oct. 30, 2008, 55 pages.
U.S. Appl. No. 12/553,661, filed Sep. 3, 2009, 33 pages.
U.S. Appl. No. 12/690,629, filed Jan. 20, 2012, 38 pages.
U.S. Appl. No. 12/854,119, filed Aug. 10, 2010, 54 pages.
U.S. Appl. No. 11/455,602, filed Jun. 19, 2006, 36 pages.
U.S. Appl. No. 12/703,467, filed Feb. 10, 2010, 37 pages.
U.S. Appl. No. 13/724,053, filed Dec. 21, 2012, 57 pages.
U.S. Appl. No. 13/031,506, filed Feb. 2, 2011, 39 pages.
Yang, Samuel, "CDMA RF System Engineering," pp. 85-94, 113 and 141-145, 1998, Artech House, Inc.
Pre-Interview First Office Action for U.S. Appl. No. 14/160,014 mailed Jul. 2, 2015, 5 pages.

\* cited by examiner

```
┌─────────────────────────────────────────┐
│ MAKE A DETERMINATION THAT A REGION OF THE│
│   RAN IS SERVING MORE THAN A THRESHOLD   │
│   EXTENT OF WCDS CONFIGURED FOR MACHINE- │       700
│    TO-MACHINE COMMUNICATION, WHEREIN THE │
│ REGION OF THE RAN INCLUDES A SET OF ONE OR│
│  MORE WIRELESS COVERAGE AREAS, AND EACH  │
│     WIRELESS COVERAGE AREA IN THE SET OF │
│    WIRELESS COVERAGE AREAS INCLUDES AT   │
│          LEAST ONE PAGING CHANNEL        │
└─────────────────────────────────────────┘
                     │
                     ▼
┌─────────────────────────────────────────┐
│  IN RESPONSE TO MAKING THE DETERMINATION,│
│    MODIFY PAGING CHANNEL PARAMETERS OF   │       702
│ EACH WIRELESS COVERAGE AREA IN THE SET OF│
│   WIRELESS COVERAGE AREAS TO INCREASE A  │
│  RATE AT WHICH THE RAN SUCCESSFULLY PAGES│
│    WCDS VIA THE SET OF WIRELESS COVERAGE │
│                   AREAS                  │
└─────────────────────────────────────────┘
```

FIG. 7

CONTROLLING WIRELESS PAGING PARAMETERS BASED ON DEVICE TYPE PREVALENCE

BACKGROUND

Wireless service providers typically design their wireless networks to include a number of partially-overlapping wireless coverage areas. A wireless communication device (WCD) may use these wireless coverage areas during call establishment, as well as to exchange bearer traffic with a radio access network (RAN) during calls. In some situations, the default communication parameters associated with a RAN paging a WCD may not be suitable for all types of WCDs.

OVERVIEW

During call establishment, a RAN may transmit one or more page request messages to a WCD in order to initiate communication with that WCD. In general, the RAN may attempt to maximize the efficiency of the paging process by using a limited number of bits to represent each paged WCD, spacing out retransmissions of paging messages, limiting the number of these retransmissions, and/or paging a WCD via a limited number of wireless coverage areas.

WCDs that engage primarily or exclusively in machine-to-machine (M2M) communication might engage in short calls to exchange relatively small amounts of data with another device. In some cases, this data is important, and other devices or systems rely upon receiving it in a predictable, scheduled fashion. Thus, for M2M devices, it is desirable to have a high call completion success rate to facilitate rapid exchange of the data. Adjusting the RAN's paging parameters to focus on reliability may result in the goal being achieved.

Accordingly, in a first example embodiment, a determination may be made that a region of the RAN is serving more than a threshold extent of WCDs configured for M2M communication. The region of the RAN may include a set of one or more wireless coverage areas, and each wireless coverage area in the set of wireless coverage areas may include at least one paging channel. The paging channel parameters of these wireless coverage areas may be modified to increase a rate at which the RAN successfully pages WCDs via the set of wireless coverage areas.

A second example embodiment may include a RAN radiating to define a plurality of wireless coverage areas, and a RAN device. The RAN device may be located within the RAN, and may be configured to make a determination that a region of the RAN is serving more than a threshold extent of WCDs configured for M2M. The region of the RAN may include a set of one or more of the wireless coverage areas, and each of these wireless coverage areas may include at least one paging channel. The RAN may also be configured to modify the paging channel parameters of each wireless coverage area to increase a rate at which the RAN successfully pages WCDs via the set of wireless coverage areas.

A third example embodiment may include a non-transitory, computer-readable storage medium, having stored thereon program instructions that, upon execution by a computing device in a RAN, cause the computing device to perform operations in accordance with the first and/or second example embodiments.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

BRIEF DESCRIPTION OF THE DRAWINGS

FIG. 7 is a flow chart, in accordance with an example embodiment.

DESCRIPTION

I. Network Architecture

Figure 1:
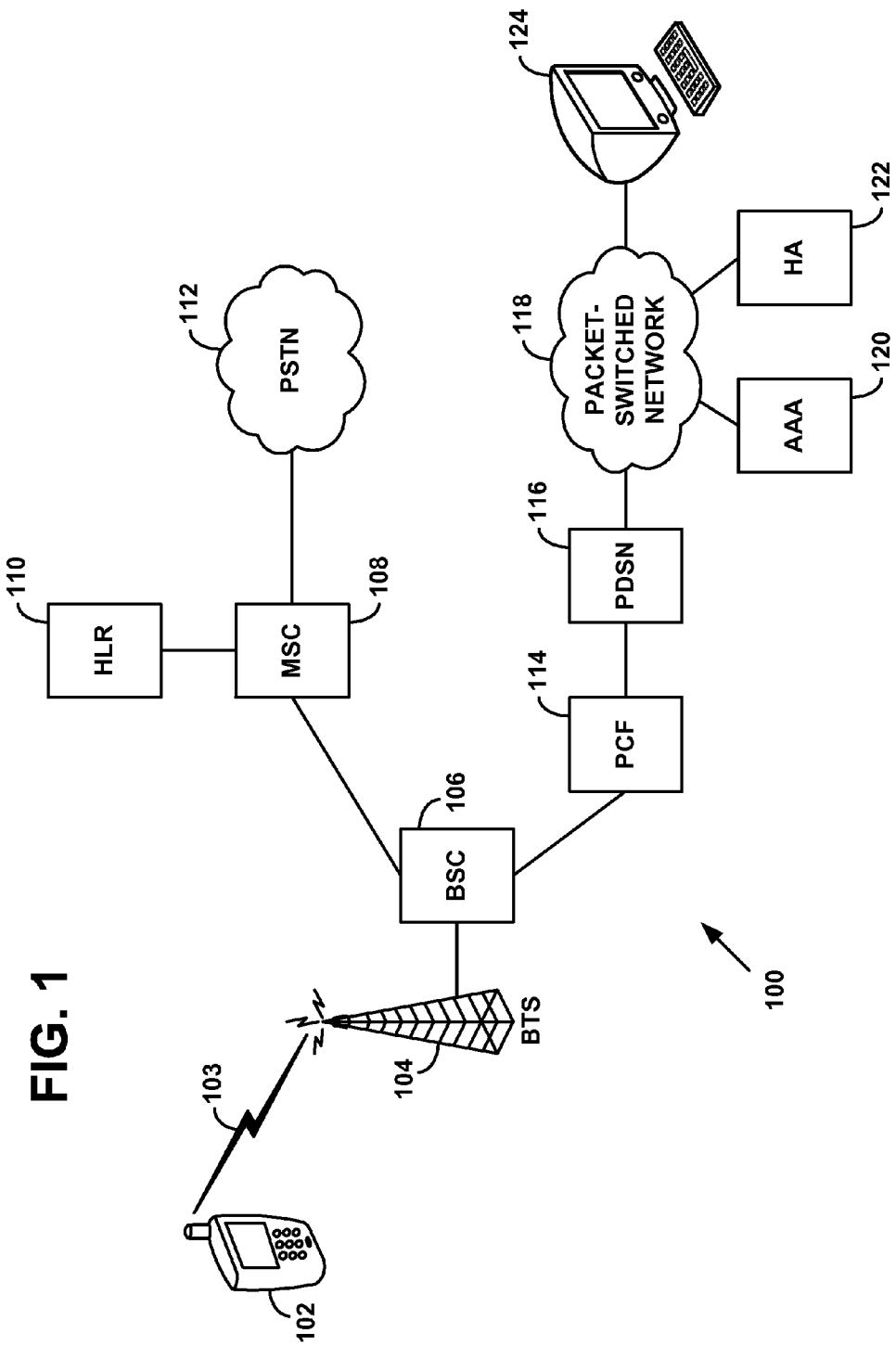
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD. BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124.

After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
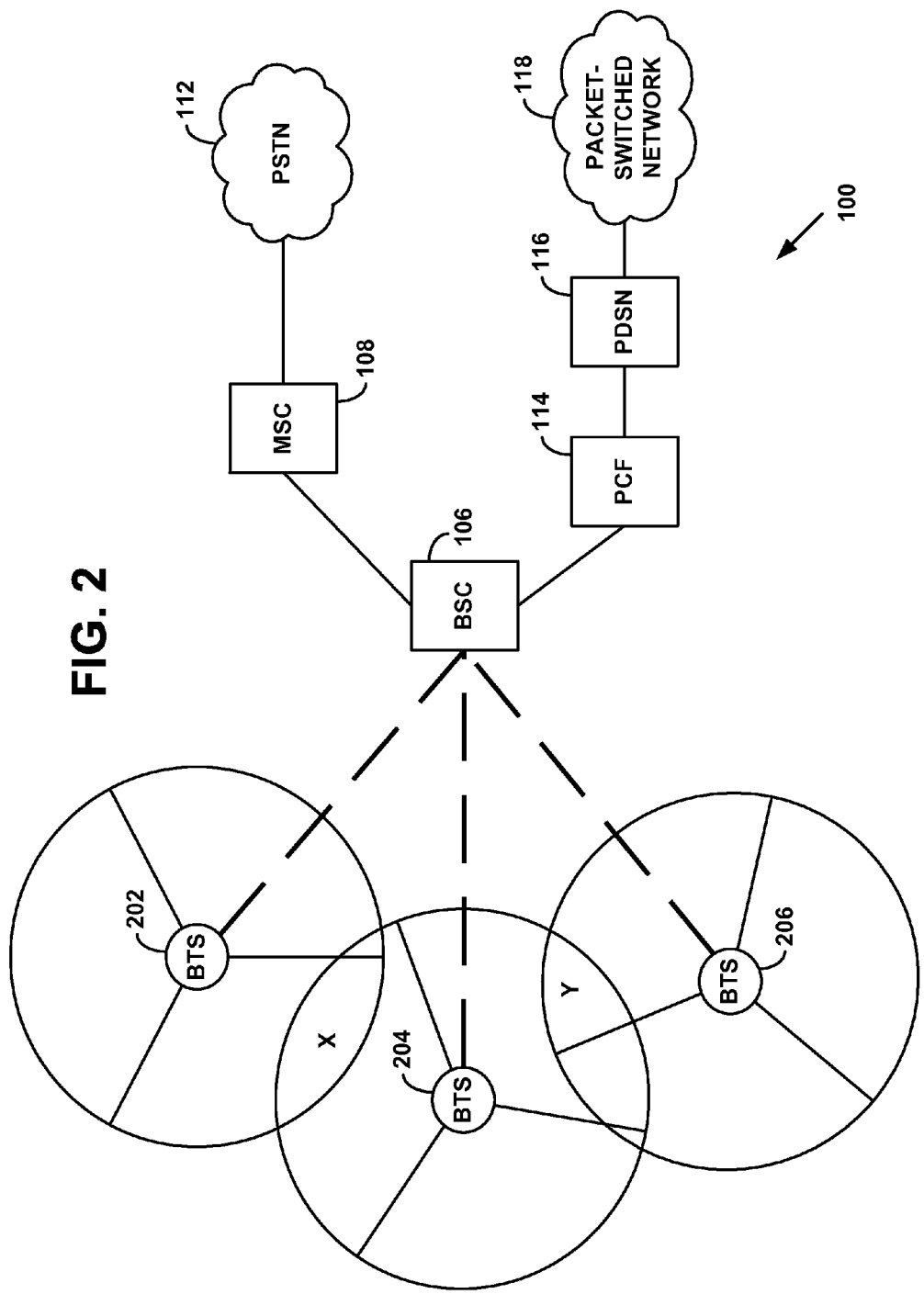
FIG. 2 depicts a RAN radiating to define several wireless coverage areas, in accordance with an example embodiment.

In practice, a BSC may serve multiple BTSs, each of which may then radiate to define one or more wireless coverage areas. This arrangement is illustrated in FIG. 2, which shows BSC 106 in network 100 coupled with BTSs 202, 204, and 206. Each BTS is shown at the core of a respective circle representing its wireless coverage, and each BTS's wireless coverage is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage need not be circular, and may take on other shapes and arrangements instead.

A WCD may receive the same bearer data simultaneously from more than one wireless coverage area. To illustrate that point, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
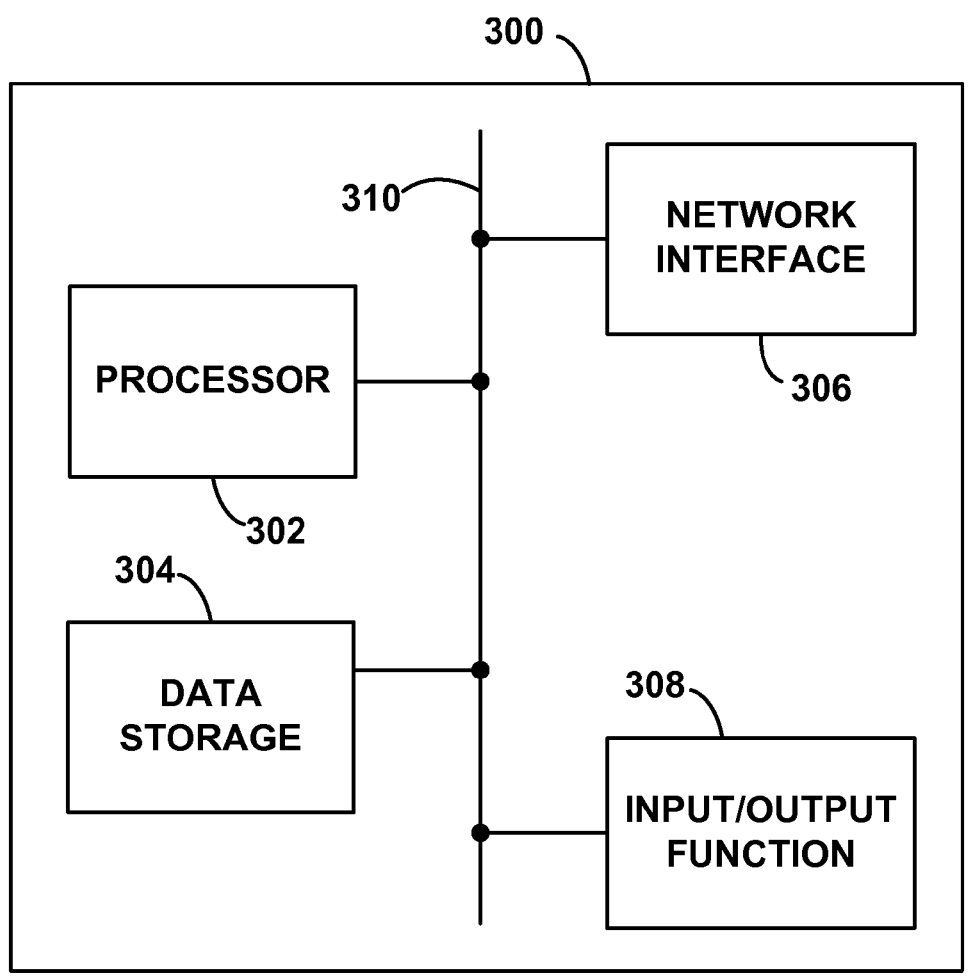
FIG. 3 is a block diagram of a RAN component, in accordance with an example embodiment.

FIG. 3 is a simplified block diagram exemplifying a RAN device 300, illustrating some of the functional components that could be included in a RAN device arranged to operate in accordance with the embodiments herein. Example RAN device 300 could be any type of device found in or associated with a RAN, such as a BTS, a BSC, or an MSC. For purposes of simplicity, this specification may equate RAN device 300 to a BSC from time to time. Nonetheless, it should be understood that the description of RAN device 300 could apply to any component used for the purposes described herein.

In this example, RAN device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs), digital signal processors (DSPs), network processors, etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions, perhaps stored on a non-transitory, computer-readable medium, executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN device 300 may support remote access from another device, via network interface 306 or via another interface (not shown), such an RS-232, universal serial bus (USB), or high-definition multimedia interface (HDMI) port.

II. CDMA Communications

For purposes of illustration, an example that uses Code Division Multiple Access (CDMA) communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area. Each of these scenarios is described below.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

b. Soft Handoff During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set," and the maximum number of wireless coverage areas per active set may be referred to as max PN.

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

c. Channel Assignment

Figure 4:
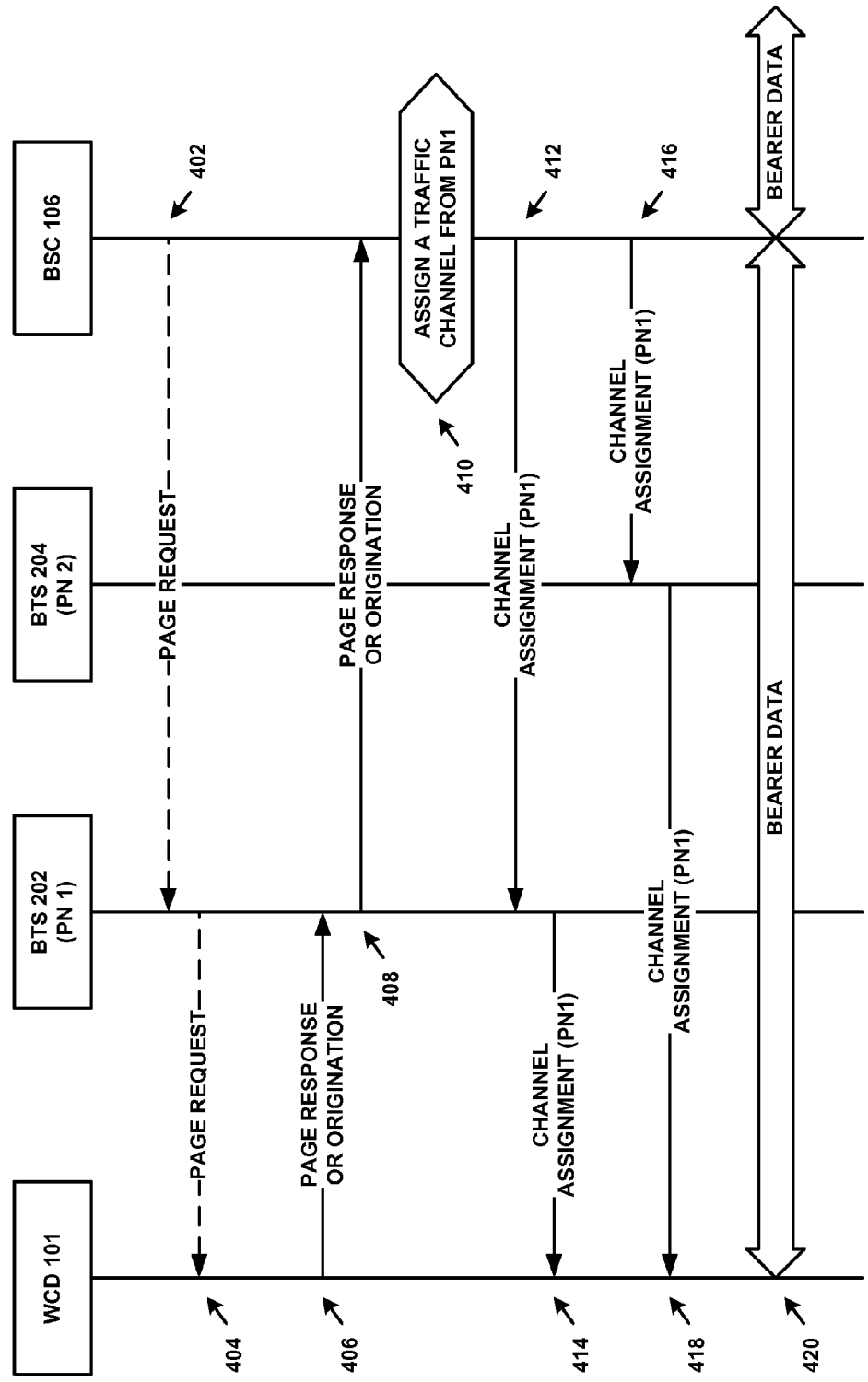
FIG. 4 is a first message flow diagram, in accordance with an example embodiment.

For purposes of illustration, FIG. 4 shows an example message flow 400 of a RAN transmitting channel assignment messages via multiple wireless coverage areas during call establishment. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 may be controlled by BSC 106. WCD 101 may be able to receive pilot channel signals of sufficient strength from both PN 1 and PN 2 such that WCD 101 could communicate effectively via either of these wireless coverage areas. Without loss of generality, it is assumed that PN 1 is the primary wireless coverage area of WCD 101.

WCD 101 may report, to BSC 106, measurements of the signal strengths at which WCD 101 receives the pilot channels of PN 1 and PN2. This reporting may occur through the transmission of radio environment reports or pilot strength measurement messages (PSMMs), or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. These considerations may be based on, for example, just the most recently-received measurement, or several recently received measurements. BSC 106 may use these received signal strengths, and/or other information, when determining from which wireless coverage area to assign a traffic channel. Thus, if BSC 106 determines that WCD 101 receives the pilot signal from PN 1 at a lower strength than that of PN 2, BSC 106 may instead assign a traffic channel from PN 2 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code to receive from PN 1. Similarly, at steps 416 and 418, BSC 106 may transmit a second channel assignment message via BTS 204 to WCD 101. The second channel assignment message may also include a traffic channel assignment for PN 1 (thus, these two channel assignment messages may serve to assign the same channel). By transmitting multiple channel assignment messages to WCD 101, the likelihood that WCD 101 receives at least one of these messages is increased. Regardless, at step 420, WCD 101 may begin receiving bearer traffic via BTS 202 (using PN 1).

While message flow 400 shows only two channel assignment messages being transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

d. Substantially Simultaneous Transmission of Bearer Data

As described in Section IIb, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Figure 5:
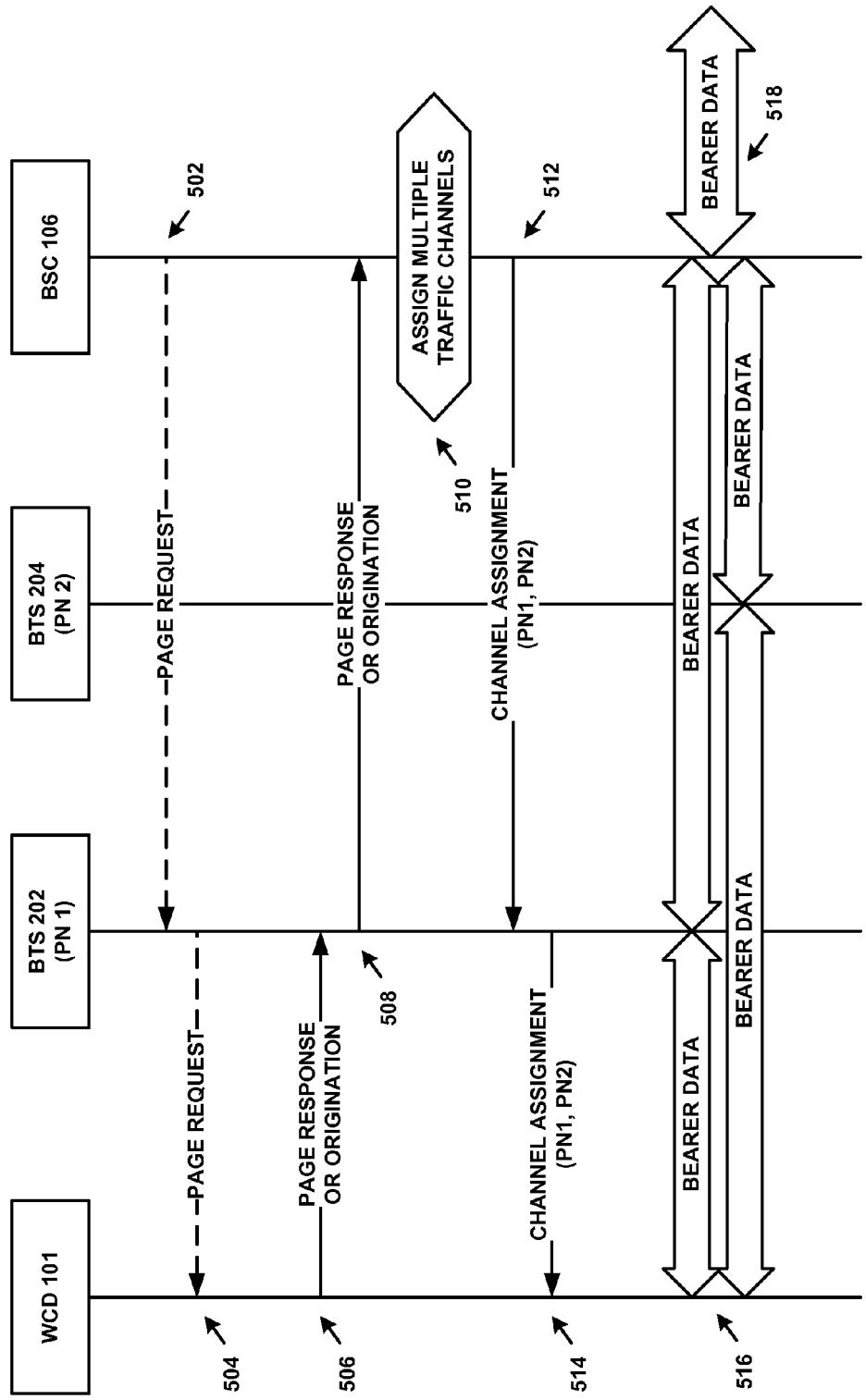
FIG. 5 is a second message flow diagram, in accordance with an example embodiment.

Channel Assignment into Soft Handoff (CASHO) has been proposed as a way of assigning multiple traffic channels from different wireless coverage areas to a WCD during call establishment. Thus, using CASHO procedures may increase the reliability and quality of the initial portions of the calls. For purposes of illustration, FIG. 5 shows an example message flow 500 of a RAN and WCD engaging in CASHO procedures. Like FIG. 4, FIG. 5 involves WCD 101, BTS 202, BTS 204, and BSC 106.

Steps 502 and 504 illustrate BSC 106, via BTS 202, transmitting an optional page request message to WCD 101. Steps 506 and 508 illustrate WCD 101 transmitting a page response message or origination message via BTS 202 to BSC 106. At step 510, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in radio environment reports or PSMMs, the page response or origination message of steps 506 and 508, or in some other type of message. In any case, BSC 106 may use these received signal strengths, and/or other information, when determining whether and/or how to perform CASHO procedures.

At steps 512 and 514, BSC 106 may transmit a channel assignment message via BTS 202 to WCD 101. The channel assignment message may include traffic channel assignments for both PN 1 and PN 2. In other words, the channel assignment message may instruct WCD 101 to use a particular Walsh code with PN 1 and another Walsh code with PN 2. Accordingly, at steps 516 and 518, WCD 101 may begin transmitting and receiving bearer data via both BTS 202 (using PN 1) and BTS 204 (using PN 2). Thus, via both BTS 202 and BTS 204, WCD 101 may receive forward direction bearer data streams from BSC 106, and may combine these streams into a single stream of bearer data. For example, WCD 101 may add the received signals from BTS 202 and BTS 204. Conversely, via both BTS 202 and BTS 204, BSC 106 may receive reverse direction bearer data streams from WCD 101, and may also combine these streams into a single stream of bearer data.

It should be understood that rather than traversing BTS 202, any of the page request messages, page response or origination messages, and/or channel assignment messages may instead traverse BTS 204, or both BTS 202 and BTS 204. Alternatively, BSC 106 may assign WCD 101 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation.

III. Example Paging Channel Operations

Some example paging channel operations were described above, in the context of FIGS. 4 and 5. However, additional paging channel operations may take place, so paging is addressed in this section as well. It should be noted that the terms "paging," "paging operations," and "paging channel parameters" may refer to operations that include one or more paging channels, one or more access channels, and/or one or more paging and access channels.

In some embodiments, a WCD is in one of at least two states while being served by a wireless coverage area. The WCD may be "active," in the sense that the WCD is allocated one or more traffic channels with which to communicate bearer data with other devices. On the other hand, the WCD may be "idle," in the sense that the WCD is not allocated a traffic channel. It is preferable for the WCD to be idle when the WCD is not actively communicating with correspondent nodes. This way, channel resources, as well as the battery life of the WCD, may be conserved.

When a RAN seeks to communicate with the WCD (e.g., to establish an incoming voice call or transmit incoming packet data) when the WCD is idle, the RAN may first page the WCD. The purpose of paging the WCD is to determine whether the WCD is still within range of its serving wireless coverage area, and if so, notify the WCD of the incoming communication. If the WCD is successfully paged, the RAN may assign one or more traffic channels to the WCD.

There may be at least two modes of paging channel operation supported by a RAN. In single-channel paging mode, the RAN supports paging any given WCD using only a single paging channel. In dual-channel paging mode, the RAN supports paging the given WCD using two paging channels. Each of these modes is described in more detail below.

a. Single-Channel Paging Mode

In single-channel paging mode, paging the WCD may involve the RAN transmitting one or more page request messages (sometimes referred to as general paging messages, or GPMs), to the WCD, via one or more primary paging channels. A primary paging channel comprises one or more of the forward links supported by a wireless coverage area. Once the WCD receives such a page request message, the WCD may reply with a page response message. After receiving the page response message, the RAN may assign one or more traffic channels to the WCD.

The primary paging channel may operate in a slotted manner, according to time-division multiplexing (TDM), and multiple WCDs may be grouped together and assigned to the same primary paging channel slot. Each paging channel slot is typically divided into four frames, each of which comprises two half-frames, resulting in a total of eight half-frames per paging channel slot. In a given paging channel slot, the RAN preferably transmits one or more page request messages, each containing information sufficient to identify which WCD or WCDs of the group (if any) are being paged.

This information may include WCD identifiers such as a Network Access Identifier (NAI), a Mobile Directory Number (MDN), a Mobile Identification Number (MIN), an International Mobile Subscriber Identifier (IMSI), an electronic serial number (ESN), and/or a mobile equipment identifier (MEID). Thus, the RAN may place one or more of these WCD identifiers in a page request message, along with a checksum value, and then transmit the page request message.

A WCD may check its assigned primary paging channel slot once every few seconds or so to receive information via the primary paging channel for the duration of the slot. These slot durations may be on the order of 80 milliseconds, and each slot may contain several hundred bits or more.

In some embodiments, a given "slot cycle index" (SCI) defines the time slots at which the WCD will check the paging channel for a page request message. For instance, WCDs may be configured to check their assigned primary paging channel slot for 80 milliseconds every 1.28, 2.56, or 5.12 seconds. The WCDs may check recurring cycles of timeslots each comprising N timeslots, where N may be an integer such as $16 \times 2^{SCI}$, and where SCI may be a slot cycle index of value 0 (zero), 1, or 2, for instance. As such, each recurring cycle of timeslots may be 16, 32, or 64 slots, corresponding respectively with the durations of 1.28 seconds, 2.56 seconds, or 5.12 seconds, respectively. The SCI of a particular WCD is typically configured in WCD's serving BSC, RNC, or BTS, but may be overridden by the WCD, or may be negotiated between the WCD and such RAN components. Further, the SCI may take on values less than 0 and greater than 2.

Regardless, these WCDs may perform this check of the primary paging channel whether or not they are actually being paged. In fact, it is likely that for the vast majority of the primary paging channel slots assigned to a given WCD, the given WCD will not be paged.

Herein, reference to a WCD "checking" or "listening to" a paging channel includes any means with which a WCD may receive information on the paging channel. This may include, but is not limited to, obtaining a modulated electromagnetic signal, on one or more carrier frequencies, representing digital information.

In order to receive such information, a WCD expends power. For instance, the WCD powers on or powers up its receiver hardware so that the WCD can receive the incoming signal from the RAN. Additionally, the WCD may process the incoming signal in order to decode this signal into a digital representation, and to validate the checksum. Then, the WCD may interpret the digital representation to determine whether the WCD is being paged. Thus, this process of frequently checking the primary paging channel can have detrimental effect on the battery life of the WCD, even if the WCD is not actively using a traffic channel.

While it may be feasible to reduce the frequency at which a WCD checks the primary paging channel, doing so may deleteriously impact session establishment latency. Suppose, for instance, the WCD checks the primary paging channel once every 10 seconds. Then, if the RAN pages the WCD to establish a communication session, there will be, on average, a delay of 5 seconds before the WCD is able to receive the first page request message. This may result in a dramatic reduction of quality for latency-sensitive applications.

A metric of the paging effectiveness of a wireless coverage area is the wireless coverage area's paging success rate (PSR). The more often that paging procedures in the wireless coverage area result in the successful paging of a WCD, the higher the PSR. PSR may be measured for a wireless coverage area as a whole (i.e., the percentage of all page request messages in a given coverage area to which a WCD responds with a page response message). However, PSR may also be measured on a per-WCD basis (e.g., the percentage of page request messages to a particular WCD to which the WCD responds with a page response message), on a per-WCD and per-coverage area basis (e.g., the percentage of page request messages to a particular WCD in a particular coverage area to which the WCD responds with a page response message), or on a regional basis (e.g., the percentage of all page request messages in a given set of one or more wireless coverage areas to which a WCD responds with a page response message).

Normally, a page request message occupies two half-frames of a paging channel slot, and therefore each paging channel slot would support at most four page records. However, multiple page records within a page request message may be concatenated so that more WCDs may be paged per page request message. For example, multiple page records can be concatenated so that they can be transmitted in a single page request message that occupies two or more half-frames. Thus, when the RAN uses paging concatenation, the RAN may be able to transmit at least four page records per paging channel slot.

Each page record may contain error detection bits, such as a checksum. Thus, once a WCD receives such a GPM, it may look for a page record directed to it (e.g., a page record with the mobile station's MIN or IMSI, for instance). If the WCD determines that it is being paged, the WCD may validate the checksum in the page record. Then, if the checksum indicates that there are no bit errors in the page record, the WCD may reply to the RAN with a page-response message. However, if the checksum indicates that one or more bits in the page record are in error, the WCD may discard the GPM, or possibly indicate to the RAN that there was an error.

While concatenating multiple page records in a page request message can reduce load on the paging channel, this concatenation can have a deleterious impact on PSR. In order for page records to be concatenated, some information, such as checksum bits, may not be included in each page record in a page request message, and may be replaced with a single checksum providing error detection over all page records in the GPM. As a result, when a given WCD receives a page request message with one or more bit errors indicated by this checksum, the given WCD may discard the entire page request message, even if the page record for the given WCD does not contain any bit errors.

Thus, paging concatenation may result in some page records failing to reach their intended WCDs, thereby reducing the PSR. Nonetheless, paging concatenation is typically enabled in RANs in order to conserve paging channel capacity.

b. Dual-Channel Paging Mode

As noted above, the act of a WCD checking the paging channel to determine whether the WCD is being paged causes the WCD to use power. In order to reduce the battery consumption of idle WCDs without introducing additional session establishment latency, a secondary paging channel (e.g., a CDMA QPCH or a UMTS® PICH) may be deployed. A secondary paging channel may be associated with a primary paging channel, and may work in conjunction with the primary paging channel. In particular, the secondary paging channel may also operate in a slotted fashion and according to TDM. Each secondary paging channel slot may correspond to a future slot on the primary paging channel.

Similar to single-channel paging mode, in dual-channel paging mode, the RAN may assign a group of one or more WCDs to each associated pair of primary paging channel and secondary paging channel slots. Each WCD in the group initially listens to only the assigned secondary paging channel slots. When the RAN determines that it will page a WCD in such a group, the RAN may first transmit a paging message during the group's assigned secondary paging channel slot. This paging message informs the group that at least one WCD in the group will be paged during the associated primary paging channel slot. Then, each WCD in the group listens to the associated primary paging channel slot, in which the RAN will transmit a page request message. The WCD or WCDs that were paged then may respond appropriately to the page request message, while the WCD or WCDs that were not paged may return to listening only to the secondary paging channel.

Secondary paging channel slots may be shorter, perhaps much shorter (e.g., on the order to a few milliseconds or less), than primary paging channel slots. Thus, secondary paging channel slots may be as little as one bit in length, whereas primary paging channel slots may be several hundred bits in length. Therefore, listening to a secondary paging channel may require less power than listening to the primary paging channel, because each WCD receives and processes fewer bits per paging channel slot.

Figure 6:
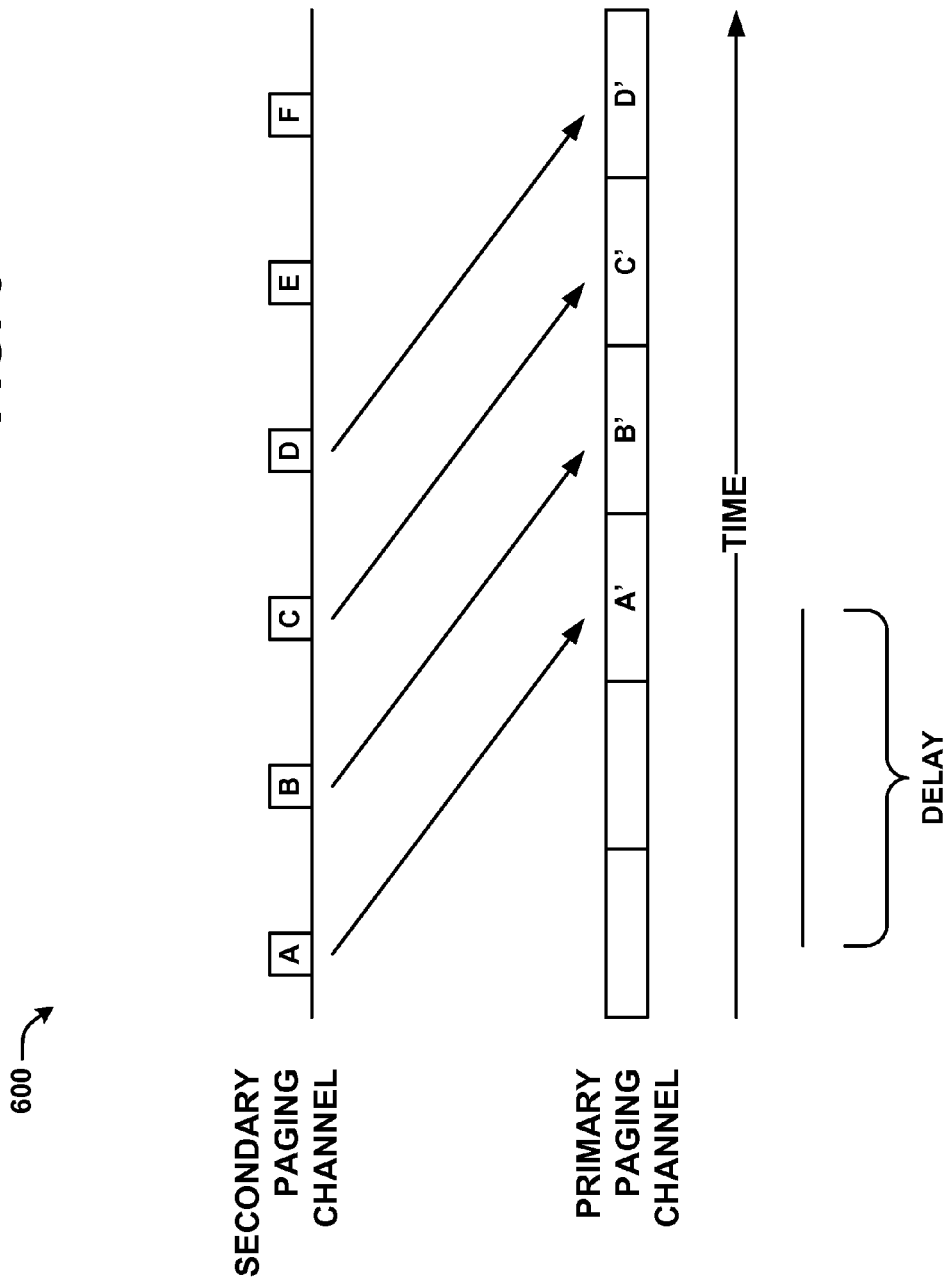
FIG. 6 is a timing diagram, in accordance with an example embodiment.

FIG. 6 illustrates secondary paging channel and primary paging channel operation in timing diagram 600. In particular, slots on a secondary paging channel and a primary paging channel are illustrated. For instance, timing diagram 600 depicts slots A, B, C, D, E, and F on the secondary paging channel. Each of these slots may consist of one or more bits and may be capable of informing one or more WCDs that these WCDs should listen on the primary paging channel during a respective associated slot. Timing diagram 600 also depicts slots A', B', C', and D' on the primary paging channel. These slots are associated with the slots on the secondary paging channel. For example, secondary paging channel slot A may be associated with primary paging channel slot A', secondary paging channel slot B may be associated with primary paging channel slot B' and so on.

There may be a fixed offset, or delay, between a secondary paging channel slot and its associated primary paging channel slot. Thus, for instance, primary paging channel slot A' may occur a particular period of time after secondary paging channel slot A, and primary paging channel B' may occur the same period of time after secondary paging channel slot B. In some embodiments, this delay may be on the order of 100 milliseconds, but other delays values are possible.

The delay between secondary paging channel slots and their associated primary paging channel slots need not be fixed—instead, this delay may vary. Any delay sufficient to allow a WCD to receive information in a secondary paging channel slot and then tune, or switch, to the primary paging channel to receive information in the associated primary paging channel slot may be sufficient.

Despite use of a secondary paging channel being an effective way of improving paging channel efficiency, it may reduce the rate at which WCDs are successfully paged. In particular, some WCDs may have difficulty accurately receiving the information in a secondary paging channel slot. Assuming for sake of simplicity that secondary paging channel slots are one bit in duration, a WCD may need to be precisely configured to be able to accurately determine the contents of the slot. For instance, a misconfigured WCD may interpret a zero on the secondary paging channel to be a one or vice versa. In fact, a WCD need not be misconfigured to exhibit such an error. Instead, the WCD may have faulty hardware, or may not be receiving the secondary paging channel at a sufficient level of power to accurately determine the contents of the slot. Regardless of the actual cause of these problems, WCD errors when receiving on the secondary paging channel can be categorized into two broad classes: false positives and false negatives.

A false positive occurs when the RAN transmits a zero in a secondary paging channel slot, but a WCD interprets this zero to be a one. The WCD may then listen to the corresponding slot on the primary paging channel. However, the RAN is not actually paging the WCD, so the WCD wastes power and battery life by listening to the primary paging channel.

A false negative occurs when the RAN transmits a one in a secondary paging channel slot, but a WCD interprets this one to be a zero. Instead of then listening to the primary paging channel, the WCD remains idle, waiting until its next assigned secondary paging channel slot. If the WCD is not actually being paged by the RAN, no harm is done. However, if the WCD is being paged by the RAN, it will not receive the page request message. Moreover, other WCDs in the same group may listen to the corresponding slot on the primary paging channel, thus wasting power and battery life if they are not being paged as well.

IV. Example M2M Devices and Applications

As noted above, an M2M device may engage primarily or exclusively in communication with one or more other devices and/or systems. This communication may occur without substantive interaction between the M2M device and a human user. For instance, the M2M device may automatically communicate according to a predetermined schedule, or may communicate based on one or more particular triggers. While this specification refers to M2M devices that are dedicated to M2M communication, some non-M2M devices may be configured to operate M2M applications.

Regardless of the M2M designation of a device or application, some extent of human interaction with such an entity may take place in order to configure, upgrade, and/or maintain the device. For instance, a remote sensor may be an M2M device. However, the remote sensor may be placed and configured by a human user. From time to time, the human user may also examine the M2M device to perform maintenance, such as rebooting the device, changing its configuration, or upgrading its software or firmware. Nonetheless, these devices may still be categorized as M2M devices due to their substantially autonomous communications with other devices.

M2M devices and applications may take various forms. For example, an M2M device may be included in a vehicle or other means of transportation. The M2M device may detect and analyze the status of the vehicle and provide status information to a third party. Such status information may include, but is not limited to, a location of the vehicle, a speed and direction of the vehicle, temperatures inside and outside the vehicle, and an analysis of damage to the vehicle. Based on the received status information, the third party may then provide emergency services, vehicle diagnostics, driving directions, or other useful information.

M2M devices can be included in other equipment as well in order to remotely monitor such equipment. For example, M2M devices may be included in household appliances (e.g., refrigerators, washing machines, etc.) and can be used to send diagnostic information to the owners or manufactures of such appliances. As another example, M2M devices may be included in medical equipment such as pacemakers, MRIs, and electrocardiograms in order to monitor a patient's health or obtain diagnostics of the medical equipment itself. M2M devices may also be included in farm equipment such as tractors and crop-irrigation equipment in order to help farmers operate or monitor such equipment from a distance. Many other implementations of M2M devices and applications are possible as well, and M2M devices are not limited to the examples provided herein.

Generally, calls involving an M2M device may exhibit a shorter average duration than calls with other types of WCDs. For instance, M2M calls may last for a few seconds, a few tens of seconds, or less than one second. On the other hand, voice calls made with mobile phones, for instance, may exhibit an average call duration of a few minutes.

V. Example Paging Modifications for Improving the Paging Success Rate

As noted above, an M2M device may engage primarily or exclusively in communication with one or more other devices and/or systems, possibly without substantive interaction between the M2M device and a human user.

Thus, an M2M device may be identified as such by the RAN. In some cases, the RAN may have access to or include a database of WCDs profiles. Such a database may be included as part of an HLR or AAA. Each profile in the database may include one or more identifiers of a respective WCD, such NAIs, MDNs, MINs, IMSIs, ESNs, and MEIDs. Other types of identifiers may be used instead of or in addition to these types. Each profile may also include an entry indicating whether the WCD is an M2M device. Therefore, the RAN may be able to determine, via such a database, whether a particular WCD is an M2M device.

If the particular WCD is an M2M device, the RAN may modify parameters related to substantially simultaneous communications via multiple wireless coverage areas for the identified M2M device. Calls made and received by M2M devices are less frequent, have low latency, and are typically shorter on average in duration, and therefore consume fewer resources than other types of calls made by other types of WCDs (e.g., voice calls). Thus, it may be advantageous for the RAN to modify paging parameters in order to increase the likelihood of setting up and completing M2M calls quickly so that resources may be utilized elsewhere.

It should also be noted that the example paging parameter modifications described herein are not mutually exclusive, and that any combination of such modifications may be implemented together.

a. Disabling Paging Concatenation

As an example paging parameter modification, the RAN may disable paging concatenation in order to increase the PSR. As noted above, enabling paging concatenation may result in information such as error detection bits (e.g., a checksum) not being included in each page record in a page request message. As a result, when a given WCD receives a page request message with one or more bit errors, the given WCD may discard the entire page request message, even if the section of the page request message containing a page record for the given WCD does not contain any bit errors.

Disabling paging concatenation for M2M devices may result in a checksum and other information being included in each page record in the page request message transmitted by the RAN to the M2M device. This may increase the likelihood of the M2M device accurately determining whether page records contain bit errors, and therefore also increase the PSR. In other words, the M2M device would be more likely to respond to the page request message with a page response message rather than discard the page request message due to the checksum flagging bit errors in page records not intended for the M2M device.

Thus, disabling paging concatenation for M2M devices may result in more page records succeeding in reaching their intended M2M devices, thereby increasing the PSR and reducing the amount of time taken to setup an M2M call.

b. Disabling Secondary Paging Channel

As noted above, utilization of a secondary paging channel (e.g., CDMA quick paging channel) may reduce the PSR. In particular, issues with the utilization of the second paging channel discussed above, such as false positives and false negatives received on the secondary paging channel, may cause the WCD to have difficulty accurately receiving information on the secondary channel slot. Further, the secondary paging channel is more susceptible to interference than the primary paging channel. When interference is experienced on the secondary paging channel, it may cause the WCD to miss an assigned secondary paging slot, due to the secondary paging channel slots (e.g., one bit in length) being shorter than the primary paging channel slots (e.g., several hundred bits in length). The WCD may then have to wait until the next assigned secondary paging channel slot (e.g., wait a few seconds). This may be disadvantageous for M2M devices in particular, as it may lengthen the duration of M2M calls when short durations are desired.

Therefore, another example paging parameter modification may be the RAN disabling the secondary paging channel for an M2M device. Doing so may reduce the likelihood of interference causing the M2M device to miss paging channel slots, and may also eliminate false positives and false negatives due to error on the secondary paging channel. Therefore, the overall accuracy at which the M2M device receives page request messages may be improved (e.g., an increase in the PSR).

The M2M device may require more power in order to listen only to the primary paging channel because the M2M device receives and processes more bits per paging channel slot. However, in some embodiments, M2M devices may be less likely to be negatively affected by increased power consumption. For instance, for M2M calls, increased power may only be required for a short duration of time, and/or M2M devices may be connected to a power source either directly or via another device to which they are coupled. Thus, power consumption and battery life may be less of a concern for some M2M devices in comparison to other types of WCDs.

c. Increasing Number of Paging Retries

In practice, a RAN may transmit, on single or dual paging channels, a limited number of page request messages to a WCD before determining that the paging has failed. For instance, upon determining that the initial page attempt has failed, the RAN may attempt to page the WCD three or four more times.

As such, it may be advantageous for the RAN to increase the number of times it attempts to retry and page an M2M device. For instance, the RAN may increase a default number of retry attempts, and attempt to page the M2M device six or seven more times after the initial attempt. In doing so, the likelihood that the M2M device receives one of the page request messages may be increased.

d. Increasing Paging Frequency

In line with the discussion above, a WCD conserves battery power by listening to the paging channel only during specific time slots that are defined by the WCD's SCI.

Thus, another example paging parameter modification may be the RAN decreasing the SCI of M2M devices (e.g., to an SCI less than zero). Decreasing the SCI may cause the M2M device to wake up more often to listen for a page request message, thereby increasing the power required to do so, as well as the likelihood that time required by paging procedures is reduced. This may result in an increased PSR, as the paging procedure for a WCD is less likely to time out.

As noted above, some M2M devices are likely to be less impeded by increased power consumption than non-M2M devices. In other words, it may be advantageous for M2M devices to sacrifice power usage in order to increase the PSR and more efficiently complete M2M calls.

e. Increasing Power on Paging Channel

In some embodiments, a RAN may have a particular level of transmission power that the RAN devotes to transmissions on certain channels in a wireless coverage area. For instance, this may be a fixed or maximum level of transmission power that the RAN dedicates to paging channel transmissions. This dedicated level of transmission power may be a portion of the total transmission power available for use in the wireless coverage area. For instance, the RAN may have a power amplifier that defines a maximum level of transmission power for the wireless coverage area as a whole, and the RAN may be set to use a particular portion of that transmission power for transmissions on paging channels defined in the wireless coverage area. Thus, for example, when the RAN has a page message to transmit to a WCD on a paging channel, the RAN may transmit that page message at the power level defined for paging channel transmissions in the wireless coverage area.

As such, the RAN may increase the default total transmission power allocated to one or more paging channels defined in a given wireless coverage area. This increased power may result in WCDs that receive signals from the RAN at a lower strength being able to receive paging messages that otherwise would be too weak.

f. Modifying Access Channel Parameters

As noted above, the term "paging parameters" may refer to operations that include one or more access channels. Similar to paging channel parameters, it may be advantageous for the RAN to modify access channel parameters for M2M devices.

One such modification may be an increase in the power with which an M2M device transmits access probe messages on the access channel. To facilitate this, the RAN may instruct M2M devices to transmit initial and/or subsequent access probe messages at a power level that is higher than the default power level that other WCDs use. This increased power may result in RAN components being able to receive access probe messages that otherwise would be too weak.

Additionally or alternatively, another such modification may be the RAN directing the M2M device to increase the number of access probe messages that the M2M device transmits on the access channel. The M2M device may consume more power to facilitate this modification. Nonetheless, increasing the number of access probe messages transmitted may increase the likelihood of the RAN receiving the access probe messages, and it may be advantageous for the M2M device to sacrifice power usage in order to do so. The more quickly the RAN receives the probe messages and responds with a channel assignment message, the more quickly the M2M call can be completed.

VI. Example Operations

FIG. 7 is a flow chart depicting an example embodiment. One or more steps of this embodiment may be carried out, for instance, by a RAN component exemplified by RAN device 300.

At step 700 of FIG. 7, a determination may be made that a region of the RAN is serving more than a threshold extent of WCDs configured for M2M communication. The region of the RAN may include a set of one or more wireless coverage areas, and each wireless coverage area in the set of wireless coverage areas may include at least one paging channel.

The WCDs configured for M2M communication may be configured to autonomously initiate or receive communication from another networked device without substantive interaction with a human user. In some cases, these WCDs may autonomously initiate or receive communication without any interaction with a human user, possibly aside from initial configuration procedures.

Determining that that the region of the RAN is serving more than the threshold extent of WCDs configured for M2M communication may also involve obtaining an identifier of a particular WCD served by the region of the RAN, using the identifier of the particular WCD to locate a profile of the particular WCD in a device database, and determining that the particular WCD is configured for M2M communication based on information in the profile.

The threshold extent of WCDs configured for M2M communication may be, for example between 50% and 100% of all WCDs that are served by the RAN in the region. Alternatively, the threshold extent may be between 60% and 100%, 70% and 100%, 80% and 100%, 90% and 100%, or may take on some value outside of these ranges. In some embodiments, the threshold extent may be expressed as a number of WCDs served by the RAN in the region rather than a percentage of all WCDs that are served by the RAN in the region.

At step 702, possibly in response to making the determination, paging channel parameters of each wireless coverage area in the set of wireless coverage areas may be modified to increase a rate at which the RAN successfully pages WCDs via the set of wireless coverage areas. Paging channel parameters of wireless coverage areas outside of the set might not be modified when such wireless coverage areas are occupied by a number of M2M devices that is less than the threshold extent.

Modifying the paging channel parameters may involve, for instance, reducing the extent of paging concatenation on the paging channels of each wireless coverage area in the set of wireless coverage areas. In some embodiments, the paging channels of each wireless coverage area in the set of wireless coverage areas include primary paging channels and secondary paging channels. Thus, modifying the paging channel parameters may include disabling the secondary paging channels.

Alternatively or additionally, modifying the paging channel parameters may encompass increasing the number of paging request messages transmitted to a particular WCD during paging of the particular WCD and/or increasing the number of wireless coverage areas through which paging request messages are transmitted to a particular WCD during paging of the particular WCD.

Each wireless coverage area in the set of wireless coverage areas may include at least one access channel. Modifying the paging channel parameters may involve instructing the WCDs served by the region of the RAN to, during call establishment procedures, increase a power with which they transmit access probe messages on the access channel and/or instructing the WCDs in the region of the RAN to, during call establishment procedures, increase an extent of access probe messages they transmit on the access channel.

It should be understood that FIG. 7 depicts a non-limiting embodiment. Thus, more or fewer steps than shown in FIG. 7 may be used without departing from the scope of the embodiments herein. Additionally, some of these steps may be repeated one or more times, or may be omitted altogether. Further, the message flows and flow charts of the figures may be combined with one another and/or with other aspects described this specification and its accompanying drawings, in whole or in part, also without departing from the scope of the embodiments herein.

In the drawings, a step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by one or more processors for implementing specific logical functions or actions in the method or technique. The program code and/or related data may be stored on any type of computer-readable medium, such as a storage device, including a disk drive, a hard drive, or other storage media.

VII. Conclusion

Example embodiments have been described above. Those skilled in the art will understand, however, that changes and modifications may be made to these embodiments herein without departing from the true scope and spirit of the invention, which is defined by the claims.

What is claimed is:
1. A method comprising:
   determining, by a radio access network (RAN) device of a RAN, that a region of the RAN is serving more than a threshold extent of wireless machine-to-machine (M2M) communication devices, wherein the region of the RAN includes a set of one or more wireless coverage areas, and each wireless coverage area in the set of wireless coverage areas includes at least a primary paging channel and a secondary paging channel, and wherein the set of one or more wireless coverage areas also serves non-M2M wireless communication devices; and in response to determining that the region of the RAN is serving more than a threshold extent of wireless M2M communication devices, modifying paging channel parameters of each wireless coverage area in the set of wireless coverage areas to increase a rate at which the RAN successfully pages the wireless M2M communication devices via the set of wireless coverage areas, wherein modifying the paging channel parameters of each wireless coverage area in the set of wireless coverage areas comprises disabling the secondary paging channel of each wireless coverage area in the set of wireless coverage areas.

2. The method of claim 1, wherein the wireless M2M communication devices are configured to autonomously initiate or receive communication from another networked device without substantive interaction with a human user.

3. The method of claim 1, wherein determining that the region of the RAN is serving more than the threshold extent of wireless M2M communication devices further comprises:
obtaining an identifier of a particular wireless M2M communication device served by the region of the RAN, using the identifier of the particular wireless M2M communication device to locate a profile of the particular wireless M2M communication device in a device database, and determining that the particular wireless M2M communication device is configured for machine-to-machine communication based on information in the profile.

4. The method of claim 1, wherein the threshold extent of wireless M2M communication devices is between 50% and 100% of all wireless communication devices that are served by the RAN in the region.

5. The method of claim 4, wherein the threshold extent of wireless M2M communication devices is between 80% and 100% of all wireless communication devices that are served by the RAN in the region.

6. The method of claim 1, wherein modifying the paging channel parameters of each wireless coverage area in the set of wireless coverage areas further comprises:
reducing the extent of paging concatenation on the paging channels of each wireless coverage area in the set of wireless coverage areas.

7. The method of claim 1, wherein modifying the paging channel parameters of each wireless coverage area in the set of wireless coverage areas further comprises:
increasing a number of paging request messages transmitted to a particular wireless M2M communication device during paging of the particular wireless M2M communication device.

8. The method of claim 1, wherein modifying the paging channel parameters of each wireless coverage area in the set of wireless coverage areas further comprises:
increasing a number of wireless coverage areas through which paging request messages are transmitted to a particular wireless M2M communication device during paging of the particular wireless M2M communication device.

9. The method of claim 1, wherein the each wireless coverage area in the set of wireless coverage areas includes at least one access channel, and wherein modifying the paging channel parameters of each wireless coverage area in the set of wireless coverage areas further comprises:
instructing the wireless M2M communication devices served by the region of the RAN to, during call establishment procedures, increase a power with which they transmit initial access probe messages on the access channel.

10. The method of claim 1, wherein each wireless coverage area in the set of wireless coverage areas includes at least one access channel, and wherein modifying the paging channel parameters of each wireless coverage area in the set of wireless coverage areas further comprises:
instructing the wireless M2M communication devices in the region of the RAN to, during call establishment procedures, increase a number of access probe messages they transmit on the access channel.

11. A system comprising:
a radio access network (RAN) radiating to define a plurality of wireless coverage areas; and
a RAN device, within the RAN, configured to:
determine that a region of the RAN is serving more than a threshold extent of wireless machine-to-machine (M2M) communication devices, wherein the region of the RAN includes a set of one or more of the wireless coverage areas, and each wireless coverage area in the set of wireless coverage areas includes at least a primary paging channel and a secondary paging channel, and wherein the set of one or more wireless coverage areas also serves non-M2M wireless communication devices; and
modify, in response to determining that the region of the RAN is serving more than the threshold extent of wireless M2M communication devices, paging channel parameters of each wireless coverage area in the set of wireless coverage areas to increase a rate at which the RAN successfully pages the wireless M2M communication devices via the set of wireless coverage areas, wherein modifying the paging channel parameters of each wireless coverage area in the set of wireless coverage areas comprises disabling the secondary paging channel of each wireless coverage area in the set of wireless coverage areas.

12. The system of claim 11, wherein the wireless M2M communication devices are configured to autonomously initiate or receive communication from another networked device without substantive interaction with a human user.

13. The system of claim 11, wherein the threshold extent of wireless M2M communication devices is between 50% and 100% of all wireless communication devices that are served by the RAN in the region.

14. The system of claim 11, wherein modifying the paging channel parameters of each wireless coverage area in the set of wireless coverage areas further comprises:
increasing a number of paging request messages transmitted to a particular wireless M2M communication device during paging of the particular wireless M2M communication device.

15. The system of claim 11, wherein modifying the paging channel parameters of each wireless coverage area in the set of wireless coverage areas further comprises:
increasing a number of wireless coverage areas through which paging request messages are transmitted to a particular wireless M2M communication device during paging of the particular wireless M2M communication device.

16. The system of claim 11, wherein the each wireless coverage area in the set of wireless coverage areas includes at least one access channel, and wherein modifying the paging channel parameters of each wireless coverage area in the set of wireless coverage areas further comprises:

instructing the wireless M2M communication devices served by the region of the RAN to, during call establishment procedures, increase a power with which they transmit initial access probe messages on the access channel.

17. An article of manufacture including a non-transitory computer-readable medium, having stored thereon program instructions that, upon execution by a computing device in a radio access network (RAN), cause the computing device to perform operations comprising:
  determining that a region of the RAN is serving more than a threshold extent of wireless machine-to-machine (M2M) communication devices, wherein the region of the RAN includes a set of one or more wireless coverage areas, and each wireless coverage area in the set of wireless coverage areas includes at least a primary paging channel and a secondary paging channel, and wherein the set of one or more wireless coverage areas also serves non-M2M wireless communication devices; and
  in response to determining that the region of the RAN is serving more than the threshold extent of wireless M2M communication devices, modifying the paging channel parameters of each wireless coverage area in the set of wireless coverage areas to increase a rate at which the RAN successfully pages the wireless M2M communication devices via the set of wireless coverage areas, wherein modifying the paging channel parameters of each wireless coverage area in the set of wireless coverage areas comprises disabling the secondary paging channel of each wireless coverage area in the set of wireless coverage areas.

18. The article of manufacture of claim 17, wherein the wireless M2M communication devices are configured to autonomously initiate or receive communication from another networked device without substantive interaction with a human user.

19. The article of manufacture of claim 17, wherein modifying the paging channel parameters of each wireless coverage area in the set of wireless coverage areas further comprises:
  increasing a number of paging request messages transmitted to a particular wireless M2M communication device during paging of the particular wireless M2M communication device.

* * * * *